United States Patent
Gould et al.

(10) Patent No.: US 9,133,773 B2
(45) Date of Patent: Sep. 15, 2015

(54) METHOD AND CONTROLLER FOR DETECTING ICE

(75) Inventors: Jonathan H. Gould, Tolland, CT (US); Jayant Sabnis, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 981 days.

(21) Appl. No.: 13/178,818

(22) Filed: Jul. 8, 2011

(65) Prior Publication Data

US 2013/0008174 A1 Jan. 10, 2013

(51) Int. Cl.

| | |
|---|---|
| *F02C 9/28* | (2006.01) |
| *F02C 7/047* | (2006.01) |
| *B64D 15/20* | (2006.01) |
| *F01D 17/08* | (2006.01) |
| *B64D 33/02* | (2006.01) |

(52) U.S. Cl.
CPC . *F02C 9/28* (2013.01); *B64D 15/20* (2013.01); *F01D 17/085* (2013.01); *F02C 7/047* (2013.01); *B64D 2033/0233* (2013.01); *F05D 2260/80* (2013.01); *F05D 2270/303* (2013.01)

(58) Field of Classification Search
CPC ... F02C 9/28; F02C 7/047; B64D 2033/0233; B64D 15/00; B64D 15/20; B64D 15/22; F05D 2270/303; F01D 25/02
USPC .......................... 60/39.091, 39.093, 782, 785; 244/134 R, 134 C
See application file for complete search history.

(56) References Cited

U.S. PATENT DOCUMENTS

| | | | | |
|---|---|---|---|---|
| 3,058,695 | A | * | 10/1962 | Simonis ........................ 244/207 |
| 3,680,309 | A | * | 8/1972 | Wallace, Jr. .................... 60/785 |
| 3,834,157 | A | * | 9/1974 | Hoffmann .................. 60/39.093 |
| 4,210,021 | A | * | 7/1980 | Vykhodtsev et al. ....... 73/170.26 |
| 4,947,640 | A | * | 8/1990 | Few et al. ....................... 60/776 |
| 5,203,724 | A | * | 4/1993 | Casey ............................ 439/792 |
| 5,442,907 | A | * | 8/1995 | Asquith et al. ................. 60/778 |
| 6,304,194 | B1 | | 10/2001 | McKillip |
| 6,347,767 | B1 | * | 2/2002 | Holmen ..................... 244/134 F |
| 6,561,760 | B2 | * | 5/2003 | Wadia et al. .................. 415/145 |
| 7,175,136 | B2 | | 2/2007 | Shah et al. |
| 7,628,359 | B2 | * | 12/2009 | Shah et al. ................ 244/134 R |
| 2005/0273292 | A1 | * | 12/2005 | Severson et al. ............. 702/130 |
| 2008/0257033 | A1 | | 10/2008 | Roberts |
| 2010/0043390 | A1 | * | 2/2010 | Jain et al. ....................... 60/204 |
| 2011/0079015 | A1 | | 4/2011 | Geis et al. |

FOREIGN PATENT DOCUMENTS

| | | | |
|---|---|---|---|
| EP | 1422137 | 5/2004 | |
| GB | 2263675 | * 8/1993 | ............ B64D 27/02 |
| WO | 2008045065 | 4/2008 | |

OTHER PUBLICATIONS

Robert Quinn and Leslie Gong In-flight boundary layer measurements on a hollow cylinder at a Mach No. of 3.0 Nov. 1980 NASA, Technical paper 1764 pp. 1-4, 33, 34, and 36.*

(Continued)

*Primary Examiner* — Andrew Nguyen

(74) *Attorney, Agent, or Firm* — Carlson, Gaskey & Olds, P.C.

(57) ABSTRACT

An example method of aircraft engine control includes detecting a difference between a temperature detected by a first temperature sensor and a temperature detected by a second temperature sensor. Anti-icing activity is initiated in response to the difference.

20 Claims, 2 Drawing Sheets

(56) References Cited

OTHER PUBLICATIONS

Whitman, Johnson, and Tomczyk Refrigeration & Air Conditioning Technology 2000 Delmar 4th edition p. 705.*
John Roberson and Clayton Crowe Engineering Fluid Mechanics 1990 Houghton Mifflin Fourth edition p. 525.*

European Search Report for European Application No. 12175107.7 dated Sep. 20, 2013.
High Altitude Ice Crystals in FAA NPRM Notice No. 10-10, entitled "Airplane and Engine Certification Requirements in Supercooled Large Drop, Mixed Phase, and Ice Crystal Icing Conditions" (75 FR 37311).

* cited by examiner

METHOD AND CONTROLLER FOR DETECTING ICE

BACKGROUND

Aircraft may occasionally operate in environments having high concentrations of ice. In these environments, ice can buildup on the aircraft, sensors and engines. Ice buildup that becomes dislodged and moves into an engine of the aircraft can damage the engine or otherwise cause the engine to become unstable. Ice buildup on the engine that does not become dislodged can block airflow to the engine and cause power loss, for example.

As known, anti-icing activities can reduce the likelihood of ice buildup. For example, a pilot of the aircraft may open an anti-icing bleed on the engine if flying through an environment having a high concentration of ice. Anti-icing activities do have drawbacks. For example, anti-icing activities may decrease the overall efficiency of the engine. Because of their drawbacks, anti-icing activities are typically initiated only after detecting environmental conditions likely to contain ice.

Accurately detecting environmental conditions likely to contain ice is sometimes difficult. For example, some types of ice, such as High Altitude Ice Crystals, cannot be detected with currently available ice detection systems. Anti-icing activities are not initiated because they exist in atmospheric conditions that are not normally associated with environments likely to contain ice. Additionally, conventional anti-icing strategies available to date on aircraft have limited or no effect on this type of ice accretion. Relying on pilots to visually identify High Altitude Ice Crystals is highly unreliable.

SUMMARY

An example method of aircraft engine control includes detecting a difference between a temperature detected by a first temperature sensor and a temperature detected by a second temperature sensor. Anti-icing activity is initiated in response to the difference.

An example method of controlling a gas turbine engine includes detecting a first temperature using a first temperature sensor that is mounted to the gas turbine engine of an aircraft. The method compares the first temperature to a second temperature that is detected by a second temperature sensor mounted to a portion of the aircraft other than the gas turbine engine. The method initiates anti-icing activity in response to a difference between the first temperature and the second temperature.

An example anti-icing controller includes a controller that determines a difference between a first temperature detected by a first temperature sensor mounted to an aircraft and a temperature detected by a second temperature sensor mounted to an aircraft. The controller initiates anti-icing activity in response to the difference.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
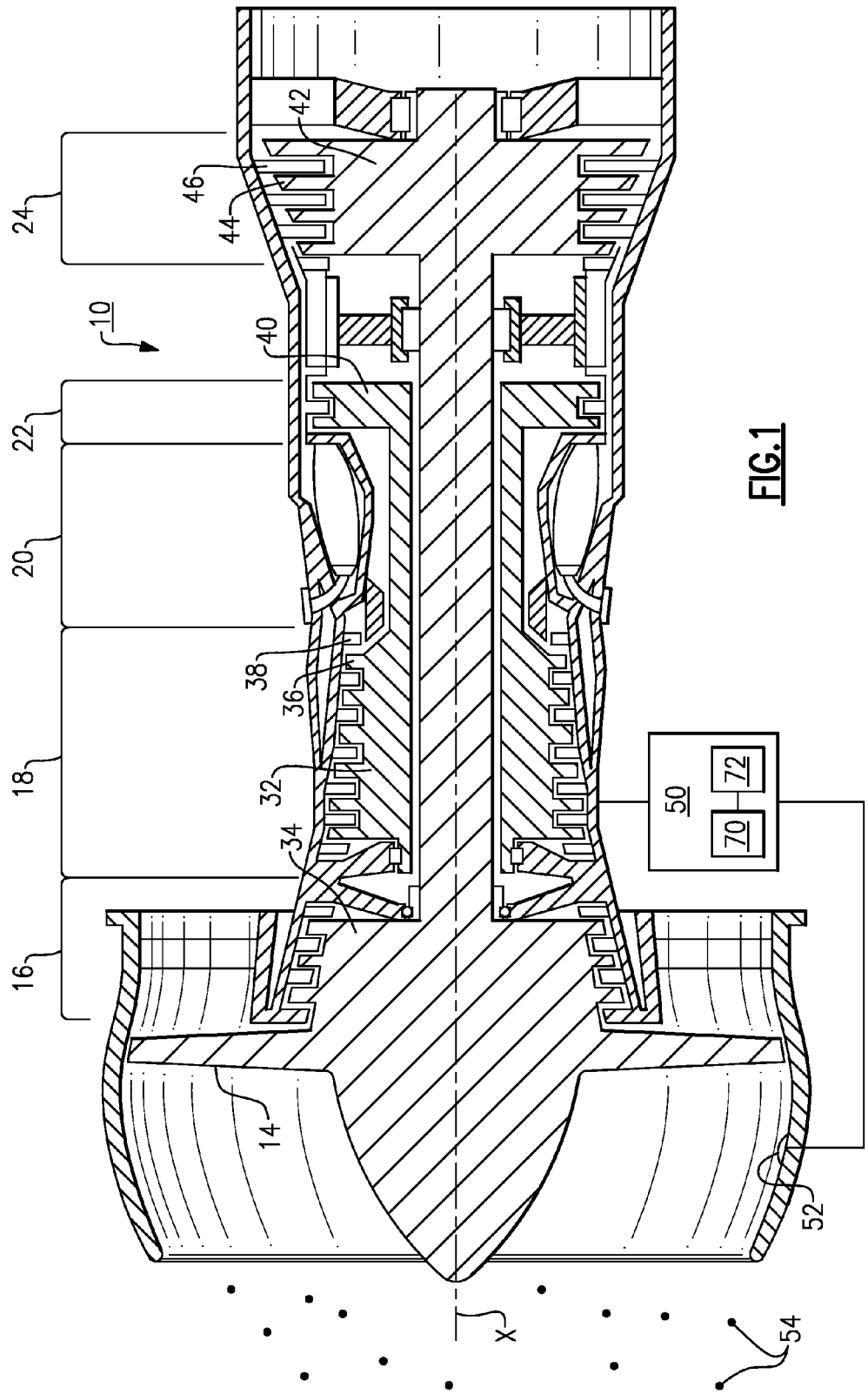
FIG. 1 shows a schematic view of an example controller assembly associated with a gas turbine engine.
Figure 2:
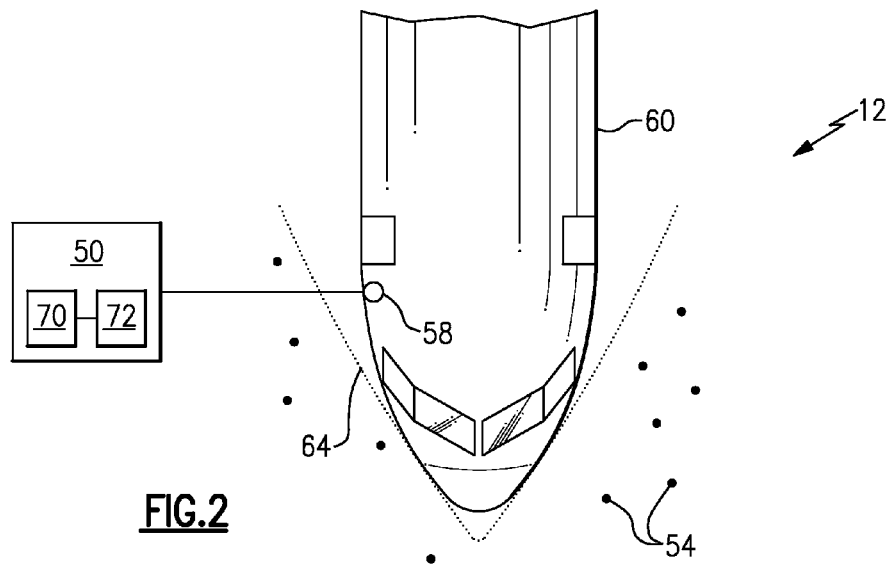
FIG. 2 shows a partial view of an aircraft incorporating the FIG. 1 controller assembly.

Referring to FIGS. 1 and 2, an example gas turbine engine 10 is used to propel an aircraft 12. The engine 10 is circumferentially disposed about an axis X. The gas turbine engine 10 includes a fan 14, a low-pressure compressor section 16, a high-pressure compressor section 18, a combustion section 20, a high-pressure turbine section 22, and a low-pressure turbine section 24. Other example turbomachines may include more or fewer sections.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The high-pressure compressor section 18 includes a rotor 32. The low-pressure compressor section 16 includes a rotor 34. The rotors 32 and 34 are configured to rotate about the axis X. The example rotors 32 and 34 include alternating rows of rotating airfoils or rotating blades 36 and static airfoils or static blades 38.

The high-pressure turbine section 22 includes a rotor 40 coupled to the rotor 32. The low-pressure turbine section 24 includes a rotor 42 coupled to the rotor 34. The rotors 40 and 42 are configured to rotate about the axis X in response to expansion to drive the high-pressure compressor section 18 and the low-pressure compressor section 16. The example rotors 40 and 42 include alternating rows of rotatable airfoils or rotatable blades 44 and static airfoils or static blades 46, for example.

The examples in this disclosure are not limited to implementation in the two-spool gas turbine architecture described, and may be used in other architectures, such as a single-spool axial design, a three-spool axial design, and still other architectures. That is, there are various types of gas turbine engines, and other turbomachines, that can benefit from the examples disclosed herein.

An engine controller assembly 50 is coupled to a temperature sensor 52 (or probe) mounted near the fan 14 of the engine 10. The sensor 52 senses the temperature of air entering the engine 10. As can be appreciated, the sensor 52 may encounter High Altitude Ice Crystals 54 and other types of ice during operation. Although only the single sensor 52 is shown, other examples may include coupling the controller 50 to more than one sensor 52 mounted to the engine 10, or multiple sensors mounted to other engines on the same aircraft.

The controller 50 is also coupled to a temperature sensor 58 mounted to a fuselage 60 of the aircraft 12. The example sensor 58 is positioned on the fuselage 60 such that the sensor 58 may be substantially shielded from the impingement of ice crystals 54 as the aircraft 12 moves through air. For example, the sensor 58 may be positioned within a boundary layer 64. Positioning the sensor 58 on the fuselage 60, remote from the engine, and substantially shielded from the impingement of ice crystals 54 as the aircraft 12 moves through air reduces the likelihood of distorted temperature readings from the sensor 58.

The High Altitude Ice Crystals 54 are a type or form of ice. The High Altitude Ice Crystals 54 may be mixed with other types of ice and/or water. The High Altitude Ice Crystals 54, and other types of ice and/or water, can build-up on the engine 10, and then break off or block airflow.

High Altitude Ice Crystals are a term of art that would be understood by a person having ordinary skill in this art. The Federal Aviation Administration has published a description of High Altitude Ice Crystals in FAA NPRM Notice No. 10-10, entitled "Airplane and Engine Certification Requirements in Supercooled Large Drop, Mixed Phase, and Ice Crystal Icing Conditions" (75 FR 37311, Docket No. FAA-2010-0636), which is incorporated herein by reference.

In one example, the High Altitude Ice Crystals 54 clog the sensor 52 as follows. First, the sensor 52 melts some of the High Altitude Ice Crystals 54 as the High Altitude Ice Crystals 54 move into the engine 10. The melted High Altitude Ice Crystals 54 then refreeze within the sensor 52, which clogs the sensor 52. The clogged sensor 52 causes the sensor 52 to report incorrect temperatures readings to the controller 50.

The clogged sensor 52 typically reports temperature readings that are incorrect because they are higher than the actual temperatures. The higher temperature readings may not indicate an environment having ice, even though the environment does contain ice in the form of the High Altitude Ice Crystals 54. Again, the sensor 58 may be substantially shielded from the High Altitude Ice Crystals 54. The sensor 58 thus does not typically clog.

Figure 3:
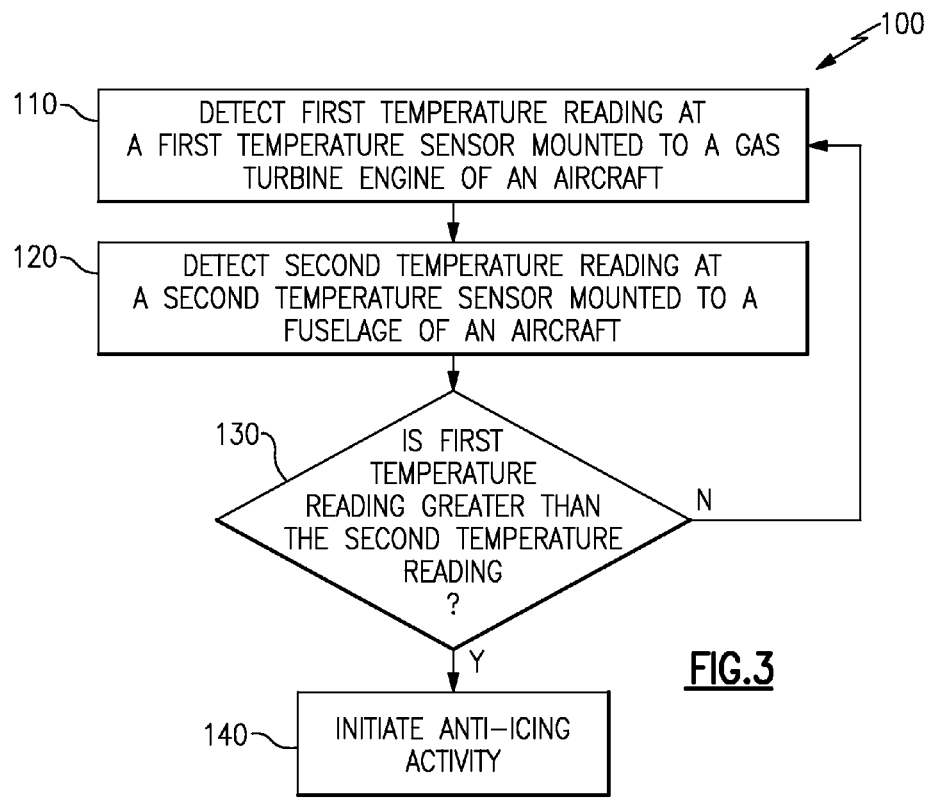
FIG. 3 shows the flow of an example method of controlling the FIG. 1 gas turbine engine.

Referring now to FIG. 3 with continuing reference to FIGS. 1-2, the example controller 50 uses a method 100 to ensure that anti-icing activity is initiated even when the aircraft 12 is flying through environments having the High-Altitude Ice Crystals 54 that have clogged the sensor 52.

The example method 100 includes detecting a first temperature reading at the temperature sensor 52 at a first step 110. The method 100 then detects a second temperature reading at the temperature sensor 58 at a step 120. At a step 130, the controller 50 determines whether the first temperature reading from the step 110 is greater than the second temperature reading from the step 120. If yes, the controller 50 automatically initiates anti-icing activity at a step 140. If no, the controller 50 continues to monitor the first temperature reading and the second temperature reading. In the prior art, the sensors 58 and 52 would be used to detect temperature exclusively for the purpose of engine powersetting and aircraft flight management.

Example anti-icing activity initiated by the controller 50 may include continuously running engine igniters within the engine 10. Other example anti-icing activity may include opening a stability bleed within the engine 10, introducing more fuel to the engine 10, or varying the position of vanes or other components within the compressor section 18 of the engine 10.

Other anti-icing activity could include initiating an electrical or pneumatic anti-icing system within the engine 10, or even initiating an alert, such as an audio or visual signal viewed by the pilot of the aircraft 12. The alert may include notifying the pilot that the aircraft 12 is flying through an area having a high ice water content, so that the pilot can maneuver the aircraft 12 out of that area or engage manual anti-icing procedures. A person having skill in the art and the benefit of this disclosure would understand other types of anti-icing activity that could be initiated by the controller 50.

In another example, the method 100 initiating anti-icing activity at the step 140 if the first temperature reading is greater than the second temperature reading at the step 130, and if the aircraft 12 is in an area likely to include the High Altitude Ice Crystals 54. Certain geographical areas, elevations, and known or predicted proximity to certain types of weather systems are more likely to include the High Altitude Ice Crystals 54 than other areas as is known.

In yet another example, the method 100 may include initiating at the step 140 if the first temperature reading is greater than the second temperature reading at the step 130, and if the aircraft 12 is in an environment likely to include the High Altitude Ice Crystals 54. Certain environments are more likely to include the High Altitude Ice Crystals 54 than other environments.

The example method 100 may maintain the anti-icing activity until the first temperature reading is no longer greater than the second temperature reading. The example controller 50 includes a processor 70 configured to execute the method 100 in the form of a program or an algorithm stored within a memory portion 72 of the controller 50. Many computing devices can be used to implement various functions described herein. In terms of hardware architecture, the controller 50 may include one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as additional controllers, buffers (caches), drivers, repeaters, and receivers to enable communications. Further, the local interface may include address, control, and/or data connections to enable appropriate communications among the aforementioned components.

The example processor 70 used within the controller 50 executes software code, particularly software code stored in the memory portion 72. The processor 70 can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 72 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The memory portion 72 may incorporate electronic, magnetic, optical, and/or other types of storage media. Note that the memory portion 72 can also have a distributed architecture, where various components are situated remotely from one another, but can be accessed by the processor 70.

The software in the memory portion 72 may include one or more additional or separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory portion 72.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Features of the disclosed example include initiating anti-icing activity to address High Altitude Ice Crystals even when temperature sensors do not report temperatures associated with ice.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of aircraft engine control, comprising:
   detecting a difference between an air temperature detected by a first temperature sensor and an air temperature detected by a second temperature sensor, the air temperature detected by the first temperature sensor and the air temperature detected by the second temperature sensor detected independently of each other, wherein the first temperature sensor and the second temperature sensor are mounted to different aircraft components; and
   initiating anti-icing activity in response to the difference.

2. The method of claim 1, wherein the first temperature sensor is mounted to a gas turbine engine.

3. The method of claim 2, wherein the second temperature sensor is mounted to a fuselage of an aircraft.

4. The method of claim 3, wherein the second temperature sensor is mounted to an area of the fuselage that is within a boundary layer of flow over the fuselage.

5. The method of claim 2, wherein the difference is the air temperature detected by the first temperature sensor that is higher than the air temperature detected by the second temperature sensor.

6. The method of claim 1, including initiating only when an aircraft engine is in an environment that is capable of High Altitude Ice Crystal formation.

7. The method of claim 1, wherein the initiating comprised providing an alert.

8. The method of claim 1, wherein the anti-icing activity comprises opening a stability bleed in a gas turbine engine.

9. The method of claim 1, wherein the anti-icing activity comprises accelerating a gas turbine engine.

10. The method of claim 1, wherein the anti-icing activity comprises continuously running engine igniters.

11. A method of controlling a gas turbine engine, comprising:
    detecting a first air temperature using a first temperature sensor that is mounted to a gas turbine engine of an aircraft;
    comparing the first air temperature to a second air temperature that is detected by a second temperature sensor that is mounted to a portion of the aircraft other than the gas turbine engine; and
    initiating anti-icing activity in response to a difference between the first air temperature and the second air temperature, wherein the first air temperature and second air temperature are detected independently of each other.

12. The method of claim 11, wherein the second temperature sensor is mounted to a fuselage of the aircraft and positioned within a boundary layer during steady-state flight of the aircraft.

13. The method of claim 11, wherein the difference is the first air temperature that is greater than the second air temperature.

14. The method of claim 11, including initiating only when the aircraft is in an environment that is capable of High Altitude Ice Crystal formation.

15. An anti-icing controller assembly, comprising:
    a controller assembly that determines a difference between a first air temperature detected by a first temperature sensor mounted to an aircraft and a second air temperature detected by a second temperature sensor mounted to the aircraft, wherein the first temperature sensor and the second temperature sensor are mounted to different components of the aircraft, wherein the controller initiates anti-icing activity in response to the difference, wherein the first air temperature does not depend on the second air temperature, and the second air temperature does not depend on the first air temperature.

16. The anti-icing controller assembly of claim 15, wherein the first temperature sensor is an ambient air temperature sensor that is mounted to an engine of the aircraft and the second temperature sensor is an ambient air temperature sensor that is mounted to a fuselage of the aircraft.

17. The anti-icing controller assembly of claim 16, wherein the second temperature sensor is mounted to the fuselage of the aircraft within a boundary layer.

18. The anti-icing controller assembly of claim 15, wherein the difference includes the first air temperature being higher than the second air temperature.

19. The method of claim 1, wherein the air temperature detected by the first temperature sensor is a temperature reading of an environment at the first temperature sensor, and the air temperature detected by the second temperature sensor is a temperature of an environment at the second temperature sensor.

20. The method of claim 4, wherein the second temperature sensor is positioned on the area of the fuselage and is further positioned remotely from the gas turbine engine.

* * * * *